United States Patent [19]
Sigurdsson et al.

[11] Patent Number: 6,164,174
[45] Date of Patent: Dec. 26, 2000

[54] COMPUTER CONTROLLED PORTIONING MACHINE

[75] Inventors: Arni Sigurdsson, Reykjavik; Arni G. Sigurdsson, Seltjarnarnes; Helgi Hjalmarsson; Hordur Arnarson, both of Reykjavik, all of Iceland

[73] Assignee: H. F. Marel, Ltd., Reykjavik, Iceland

[21] Appl. No.: 09/023,072

[22] Filed: Feb. 13, 1998

[30] Foreign Application Priority Data

Feb. 13, 1997 [IS] Iceland ............................................. 4428

[51] Int. Cl.[7] ................................. B26D 4/34; B26D 5/34
[52] U.S. Cl. ...................... 83/13; 83/74; 83/77; 83/365; 83/367; 83/370; 83/932
[58] Field of Search ................................. 83/13, 365, 367, 83/77, 75, 74, 370, 932

[56] References Cited

U.S. PATENT DOCUMENTS

| | | |
|---|---|---|
| 2,768,666 | 10/1956 | Garapolo . |
| 3,762,257 | 10/1973 | Mathews . |
| 4,136,504 | 1/1979 | Wyslotsky . |
| 4,557,019 | 12/1985 | Van Devanter . |
| 4,875,254 | 10/1989 | Rudy et al. . |
| 5,054,345 | 10/1991 | Weber . |
| 5,163,865 | 11/1992 | Smith . |
| 5,184,733 | 2/1993 | Arnarson . |

FOREIGN PATENT DOCUMENTS

| | | |
|---|---|---|
| 0 504 446 A1 | 9/1992 | European Pat. Off. . |
| 2 627 423 | 8/1989 | France . |

*Primary Examiner*—M. Rachuba
*Assistant Examiner*—Sean Pryor
*Attorney, Agent, or Firm*—Pillsbury Madison & Sutro LLP

[57] ABSTRACT

The invention involves a method and apparatus for automatic portioning of objects. More specifically, the invention utilizes both weighing and imaging data in order to calculate an estimated weight distribution of objects being processed. One or more weighing units, which weigh one or more parts of the objects, are installed before and/or after a cutting unit to obtain the weighing data. A computer system controls cutting based on the imaging data and the weighing data.

37 Claims, 7 Drawing Sheets

FIG. 7

COMPUTER CONTROLLED PORTIONING MACHINE

TECHNICAL FIELD OF THE INVENTION

The present invention concerns a method and apparatus for controlling automatic portion cutting of objects into pieces based upon an estimated weight distribution for each of the objects. More specifically, the method involves utilizing both weighing and imaging in order to calculate the weight distribution for each of the objects, which is being processed at any time.

BACKGROUND OF THE INVENTION

It is well known that food such as fish and meat are sold and later served in predetermined portions (on the basis of weight and/or shape). This is the case with both the catering and the household sectors. Production of such fish and/or meat portions was previously performed by manual cutting, but various accessories and portion cutting machines have been developed in recent years. Studies have shown that manual portion cutting of fish fillets into predetermined sizes and shapes can yield a deviation in portion size of up to 10%, if no special methods are employed to increase the accuracy of manual cutting. Equipment is known which is based on either weighing or some kind of imaging. Repeated studies have shown that deviation in portion size may be around 5% when weighing, scales, or imaging devices are used to control the cutting machinery. In effect, such imprecision means a loss to the producer, since he needs to take this deviation factor into account in his agreements with buyers, and allow for overweight. In all probability, therefore, the producer receives a lower price per unit weight for the raw material input as weighed in comparison to what he would receive if he could reduce the deviation from the negotiated weight.

U.S. Pat. No. 4,557,019 describes a method and equipment for automatic control of portion cutting of fish. More specifically, the patent describes portion cutting equipment whereby images of a fish filet are recorded, and the data is used to calculate and cut the filet into pieces of predetermined size.

European patent No. 504,446 also describes a method and equipment for automatic portion cutting of fish or meat material. More specifically, the patent describes automatic portion cutting equipment whereby the fish or meat to be portioned is weighed before cutting, and that data is used to calculate and cut the material into pieces of predetermined constant weight.

U.S. Pat. No. 5,184,733 describes a method and equipment for determining the volume, form, and weight of fish transported on a conveyor belt under and past imaging equipment which records a series of images, for example of a piece of fish as it is transported on the conveyer belt. Another series of images (reflections) is recorded simultaneously. These data, along with other data, such as the speed of the belt, physical properties of the material, etc., are used to determine the weight, volume, and shape of the objects in order to control equipment for grade and sort it. For example, fish fillets are sorted into various categories.

Modern food processing demands high levels of productivity and precision. The imprecision inherent in the technology described above results in large deviations in portion size. Enhanced processing technology would lead to much better utilization of raw material and thus cost-effectiveness of processing.

SUMMARY OF THE INVENTION

The object of the invention is to present a method and equipment for controlling automatic portion cutting of objects into pieces based upon an estimated weight distribution for the objects. The object is both weighed and imaged and the resulting data are used to control equipment for cutting the object. This technology reduces deviations from predetermined portion volumes, weights, and shapes to previously unknown levels.

The object of the invention is achieved by providing an apparatus comprising: a conveyor, imaging equipment, a computer system, and a weighing unit disposed after the cutting unit. The conveyor is for conveying the objects, and the imaging equipment takes image data for a present object to be cut as the object is conveyed on the conveyor. The imaging equipment sends out put signals representative of the image data. The computer system utilizes the output signals representative of the image data to establish presently measured dimensional information for the present object to be cut. The computer system calculates an estimated weight distribution for the present object to be cut based upon at least one estimated physical characteristic established by a plurality of previously cut objects and the presently measured dimensional information for the present object to be cut. The computer system utilizes the estimated weight distribution to calculate an estimated weight for each of the pieces into which the present object is to be cut. The cutting unit is responsive to output of the computer system to cut each object into the pieces based on the estimated weight distribution for that object. The weighing unit determines an actual weight for each cut piece, and transmits data on the actual weight of each cut piece to the computer. The computer system compares the actual weight of each cut piece to the estimated weight for that piece and stores the comparison. The computer system periodically re-estimates the at least one estimated physical characteristic based upon a plurality of previously stored comparisons. The computer implements that at least one re-estimated physical characteristic for use with future image data to establish estimated weight distributions for future objects to be cut.

The object of the invention is further achieved by providing an apparatus comprising: a conveyor, imaging equipment, an computer system, and a weighing unit disposed before the cutting unit. The conveyor conveys the object, and the weighing unit obtains an actual weight of the object. The imaging equipment takes image data for the object as the object is conveyed on the conveyor. The computer system receives signals from the imaging equipment based upon the image data to estimate a total volume and a volume distribution of the object. The computer system utilizes the estimated volume distribution, the estimated total volume, and the actual weight to calculate an estimated weight distribution for the object. The cutting unit is operatively connected with the computer system for cutting the object at locations based on the estimated weight distribution.

The object of the invention is also achieved by providing a conveyor, imaging equipment, a cutting unit, a computer system, a weighing unit before the cutting unit, and a weighing unit after the cutting unit. The conveyor conveys the object, and the imaging equipment takes image data for a present object to be cut as the object is conveyed on the conveyor. The imaging equipment sends output signals representative of the image data. The cutting unit cuts the present object on the conveyor into pieces. The weighing unit before the cutting unit determines a total actual weight for the present object to be cut, and the weighing unit after the cutting unit determines an actual weight for each cut piece, and transmits output data representing the actual weight of each cut piece. The computer system utilizes the output signals representative of the image data and a current estimated formline to establish an estimated volume distribution and estimated total volume for the present object to be cut. The computer system calculates an estimated density of the present object to be cut based upon the estimated total volume of the object to be cut and the actual total weight of the present object to be cut. The computer calculates an estimated weight distribution for the present object to be cut based upon the estimated density of the present object to be cut and the presently measured estimated volume distribution for the present object to be cut. The computer system utilizes the estimated weight distribution to calculate an estimated weight for each of the pieces into which the present object is to be cut. The cutting unit is responsive to output of the computer system to cut each object into the pieces based on the estimated weight distribution for that object. The computer system compares the actual weight of each cut piece to the estimated weight for that piece to establish a percentage error therebetween. The computer system stores the percentage error. The computer periodically utilizes a plurality of previously calculated percentage errors and the current estimated formline to establish a re-estimated formline for use with future image data to establish estimated total volumes and estimated volume distributions for future objects to be cut.

In accordance with a method of the present invention which utilizes an inweigher, the following steps are performed: conveying an object to be cut; weighing the object to be cut to establish an actual weight for the object to be cut; taking image data for the object to be cut; utilizing the actual weight and the image data to establish an estimated weight distribution for the object to be cut; and cutting the object based on the estimated weight distribution.

The object of the present invention is also achieved in accordance with a method which uses an outweigher, wherein the following steps are performed: conveying a present object to be cut; taking image data for the present object to be cut; utilizing at least one estimated physical characteristic established for previously cut objects and the image data for the present object to be cut to establish estimated portions weights into which the present object is to be cut; utilizing a cutting unit to cut the present object into portions having the estimated portions weights, weighing each of the cut portions to establish an actual weight for each of the cut portions; comparing the actual weight for each portion with the estimated portions weight thereof; and utilizing a plurality of such comparisons for re-estimating said at least one estimated physical characteristic for use in cutting future objects.

In general, the present invention employs one or more weighing units, which weigh one or more parts of the objects before and/or after the cutting equipment, and then transmit data to a computer which, in addition to the previously calculated sizes, contains inputted and/or measured data on the speed of the conveyor belt, on the physical properties of the objects, on its shape, etc., and recalculates the volume, weight and shape of the objects and/or parts of it, and applies these recalculated data in order to control equipment for cutting it.

Broadly, the method which utilizes and inweigher achieves its objective by conveying an object to be cut; weighing the object to be cut to establish an actual weight for the object to be cut; obtaining dimensional information on the object to be cut by imaging; utilizing the actual weight and said dimensional information to establish cutting control signals; cutting the object based on said cutting control signals so that the object is cut based on the actual weight and the dimensional information of the object.

Broadly, the method for automatically cutting objects into portions which utilizes and outweigher achieves its objective by: conveying a present object to be cut; obtaining dimensional information on the present object to be cut by imaging; cutting the present object into present pieces based on the dimensional information on the present object and on an actual weight of cut pieces from previously cut objects; and weighing the present pieces for use in cutting future objects.

Furthermore, the invention is unique in that the weighing units are located so as to weigh portioned and/or non-portioned material and transmit data on it to a computer which recalculates, compares and adjusts previous calculations of the volume, weight or shape of portioned and/or non-portioned material, and uses this recalculated data in order to control equipment.

A further configuration of the equipment is unique in that the weighing unit which is located in front of the cutting equipment for weighing of non-portioned material can either by a dynamic (flow) scale or a static (trough) scale.

These and other objects of the invention will be more fully appreciated from the following detailed description, drawings, and appended claims, wherein a preferred embodiment is set forth.

DETAILED DESCRIPTION OF THE DRAWINGS

DETAILED DESCRIPTION OF THE INVENTION

Figure 1:
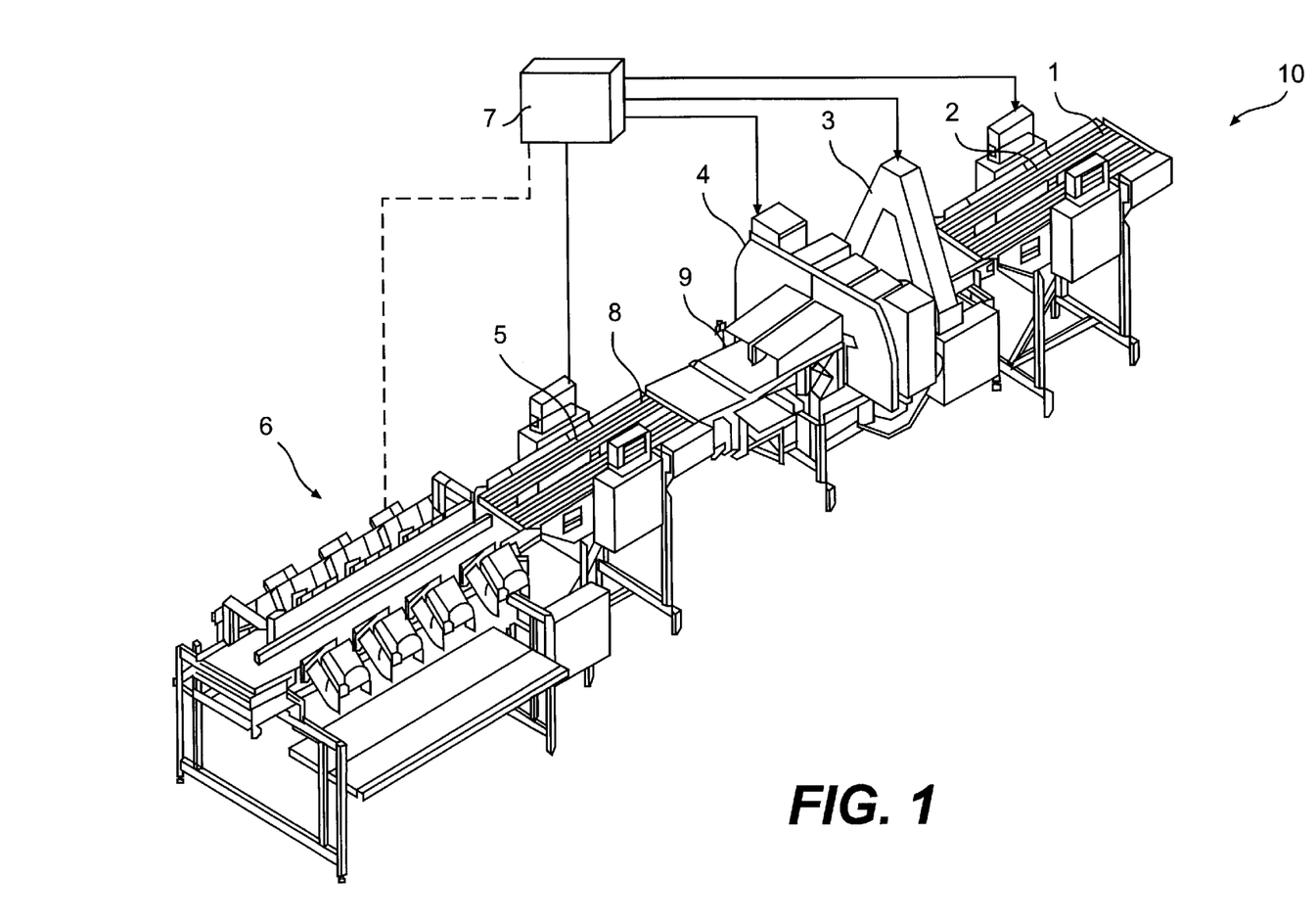
FIG. 1 is a perspective view of the portioning apparatus.

FIG. 1 is a perspective view of the portioning apparatus, generally indicated at 10, in accordance with the invention. The objects to be cut are placed on a conveyor, which can be of any known type. In the present invention, the conveyor comprises a plurality of conveyor assemblies longitudinally aligned end-to-end with one another. The plurality of conveyor assemblies includes a first conveyor belt (1) on which the object to be but is placed. The first conveyor belt (1) transports the object to be cut to and across a first weighing-scale (or inweigher) (2) disposed beneath the conveyor belt (1). Preferably, the first weighing scale comprises a conventional load cell arrangement. The first weighing-scale (2) weighs the objects, such as fish, chicken, beef, etc. to be cut. From there, the objects are transported on a second conveyor belt (9) of the conveyor through the imaging equipment (3), where a series of images of the object are recorded as image data. Preferably, the imaging equipment is made in accordance with U.S. Pat. No. 5,184,733, which is hereby incorporated by reference. The image data is any dimensional information for the object to be cut that can be used by the computer system (7) to calculate an estimated volume distribution (VD) of the object. Such dimensional information can be preferably two or more of height (h), width (w), or length (l), or overall form of the object. The calculated estimated volume distribution can be used to determine an estimated total volume (TV) of the object. The data measurements from the weighing-scale (2) and the image data from the imaging equipment (3) are transmitted to a computer system (7).

The computer system (7) receives signals from the imaging equipment and based thereupon, estimates a total volume and a volume distribution of the object. The computer system (7) utilizes the estimated volume distribution and the estimated total volume measured by the imaging equipment (3), and the actual weight measured by the weighing-scale (2), to calculate an estimated weight distribution for the object.

Pre-input parameters and/or calculated measurements of the velocity of the conveyor belts, and thus the speed at which the object passes through the equipment, are also input to the computer system (7). The velocity of the conveyor belts and image taken by the imaging equipment can be used by the computer system to determine the relative position (RP) of the object to be cut on the conveyor. Alternately, the use of encoders, sensors, or combination thereof, can also be used to determine the relative position of the object to be cut on the conveyor. The relative position of the object to be cut is sent to the computer system (7).

The computer system (7) then transmits data to a cutting unit (4) operatively connected thereto. The cutting unit (4) cuts the object at locations based on the estimated weight distribution calculated by the computer. From the cutting unit (4), the objects are transported on a third conveyor belt (8) across a second weighing scale (or outweigher) (5), where each individual portioned part of the object is weighed before being transported for further processing, or for grading by the grading equipment (6). The second weighing scale (5) is positioned beneath the third conveyor belt (8) and weighs the object as it is transported across the conveyor belt (8).

Rather than utilizing the measurements of the first weighing unit (or inweigher) (2) to control cutting, the second weighing unit (or outweigher) (5) may be used. In this instance, the computer system (7) utilizes output signals from the imaging equipment (3) representative of image data for the object, such as the data relating to the height, length, width, and/or form of the object to establish presently measured dimensional information for the present object to be cut.

The computer system (7) calculates an estimated weight distribution for the present object to be cut based upon at least one estimated physical characteristic, such as the object's density and/or formline, established by a plurality of previously cut objects and the presently measured dimensional information for the present object to be cut.

When the outweigher (5) measurements are used to control cutting, it is preferred for the at least one estimated physical characteristic to be an estimated formline for the object, although density or some combination of formline and density can be used. The formline (f) is a quantity which is known in the food processing art, and relates generally to the shape, form, and orientation of the object. The formline (f) can be defined as a percentage of a given cross-sectional area occupied by the object to be cut. For example, the object having an irregular cross-sectional configuration has a maximum height $h_{max}$ and a maximum width $W_{max}$, and the formline percentage is the percentage of the area $(h_{max}) \times (W_{max})$ occupied by the cross section. In other words $f = A_{actual}/A_{max}$, where $A_{actual}$ is the actual cross sectional area of the object to be cut and $A_{max}$ is the cross-sectional area of the rectangle defined by the maximum height and maximum width of the cross section. It thus can be appreciated that the actual cross-sectional area for any particular portion of the object is can be obtained from the following formula: $A_{actual} = (h_{max}) \times (W_{max}) \times f$.

The at least one estimated physical characteristic, such as formline, is periodically updated or reestimated based upon subsequent measurements and comparisons as will be described below.

The computer system (7) utilizes the estimated weight distribution as described above to calculate an estimated weight for each of the pieces into which the object is to be cut.

As was the case where cutting was controlled based on the inweigher (2) measurements, the cutting unit (4) is responsive to output of the computer system (7) to cut each object into portions based on the estimated weight distribution for that object. Here, however, the second weighing unit (5) determines an actual weight for each cut piece, and transmits data on the actual weight of each cut piece to the computer system (7). The computer system (7) compares the actual weight of each cut piece to the estimated weight for that piece and stores the comparison. The computer system (7) periodically re-estimates the at least one estimated physical characteristic based upon a plurality of previously stored comparisons. For example, if the computer system (7) determines that the actual weight of several cut pieces is heavier than the estimated weight for those pieces, the computer system (7) may re-estimate the formline of the objects to be some greater value. The greater the percentage error between the estimated portion weights (EPW) and the actual portion weights (APW) will determine the extent to which the estimated formline will be changed. The computer implements the at least one re-estimated physical characteristic, such as formline, for use with future image data to establish estimated weight distributions for future objects to be cut.

As a further alternative for controlling the cutting of objects, both the first weighing unit (2) and second weighing unit (5) can be used. In this instance, the first weighing unit (2), disposed before the cutting unit (4), determines a total actual weight for the present object to be cut. The second weighing unit (5), disposed after the cutting unit (4), determines an actual weight for each cut piece and transmits output data representing the actual weight of each cut piece to the computer system (7).

The computer system (7) utilizes the output signals representative of the image data and a current estimated formline to establish an estimated volume distribution and estimated total volume for the present object to be cut. The computer system (7) calculates an estimated density of the present object to be cut based upon the estimated total volume of the object to be cut and the actual total weight of the present object to be cut. The computer system (7) calculates and estimated weight distribution for the present object to be cut based upon the estimated density of the present object to be cut and the presently measured estimated volume distribution for the present object to be cut. The computer system (7) utilizes the estimated weight distribution to calculate an estimated weight for each of the pieces into which the present object is to be cut. The cutting unit (4) is responsive to output signals of the computer system (7) to cut each object into the pieces based on the estimated weight distribution for that object. The computer system (7) compares the actual weight of each cut piece to the estimated weight for that piece to establish a percentage error therebetween. The computer system (7) stores the percentage error. The computer periodically utilizes a plurality of previously calculated percentage errors and the current estimated formline to establish a re-estimated formline for use with future image data to establish estimated total volumes and estimated volume distributions for future objects to be cut.

The weight distribution can be summed to determine a total weight of the object to be cut in the instance in which an inweigher is not used. The total weight (whether using imaging or the inweigher) can be used to determine what sort or portioning division rules should be employed. For example, for an 18 ounce object, it may be predetermined that 3 six ounce portions should be cut. Alternately, it may be predetermined that 3 five ounce portions and 1 three ounce portion should be cut. Alternately, the total length of the object, as measured by the imaging equipment (3), can be used to set the division rules.

The computer system (7) described in each of the examples above can be a stand alone system that receives input from the inweigher (2) and/or outweigher (5). Such a stand alone computer system (7) would also receive input from the imaging equipment (3) and conveyor (1, 9, 8). The computer system (7) would output instructions to the cutting unit (4) for cutting the objects on the conveyor as the objects are conveyed. The computer system (7) can utilize any form or combination of hardware, software, and/or memory that can be used to receive, process, and output data required for this application.

Alternately, for the computer system (7) may comprise a plurality of component units, each associated with one or more of the other components forming the entire apparatus (10). For example, the imaging equipment may be provided with its own microprocessor. The same may also be true for the cutting unit (4), and conveyor (1,9,8). The microprocessors of these components can communicate with one another to form a computer system that achieves the same results as a stand alone computer system, as can easily be appreciated by those skilled in the art.

The imaging equipment (3) in the examples described above yields precise data on the form and volume of the objects. Preferably, the imaging equipment is used to obtain image data on the length, width, and thickness of the object to be cut. The image data can be used by the computer system (7) to establish an estimated weight distribution of the object.

At least 5 linear images are scanned per cm at right angles to the direction in which the objects are moving. With a single linear or linescan camera, images are simultaneously recorded of the width of the objects and, using a mirror, a side view, thereby yielding data about its height. Three points are measured on each image/line, i.e. the starting point and final point of the object (total length), and its highest point, thereby producing 60 points of measurements per cm. On the basis of this information, along with data on the location of the objects on the conveyer belt, it is possible to obtain a precise three-dimensional measurement of the objects. This technique enables high processing speed and high accuracy to be achieved. For example, an object 25 cm long is measured at 25×3×5 points, or 375 points in all. An image of each object thus comprises a large number of cross-sectional measurements. The volume is calculated by multiplying the surface area of the cross-sectional measurements with the speed of the conveyer belt and the interval between measurements. For a more detailed description of the preferred imaging equipment, refer to the incorporated U.S. Pat. No. 5,184,733.

Various other imaging techniques are also known which could also be employed in the present invention. For example, the technique disclosed in U.S. Pat. No. 4,557,019, hereby incorporated by reference, can also be used.

The cutting unit (4) is preferably in the form of a rotary guillotine type unit. The cutting unit preferably comprises a pair of rotary blades mounted on opposite sides of the conveyor. The blades are each mounted on the distal end of a rotary arm that has its proximal end mounted for rotation by a computer system controlled motor. The axis of rotation is parallel to the conveying direction, and each blade traverses a circular path within a plane perpendicular to the conveying direction and the axis of rotation. Each blade passes through a narrow gap between conveyor belts 1 and 8 to cut the object as it traverses the gap. Other known cutting units can also be used, although not preferred, such as that disclosed in U.S. Pat. No. 4,557,019, incorporated by reference.

Figure 2:
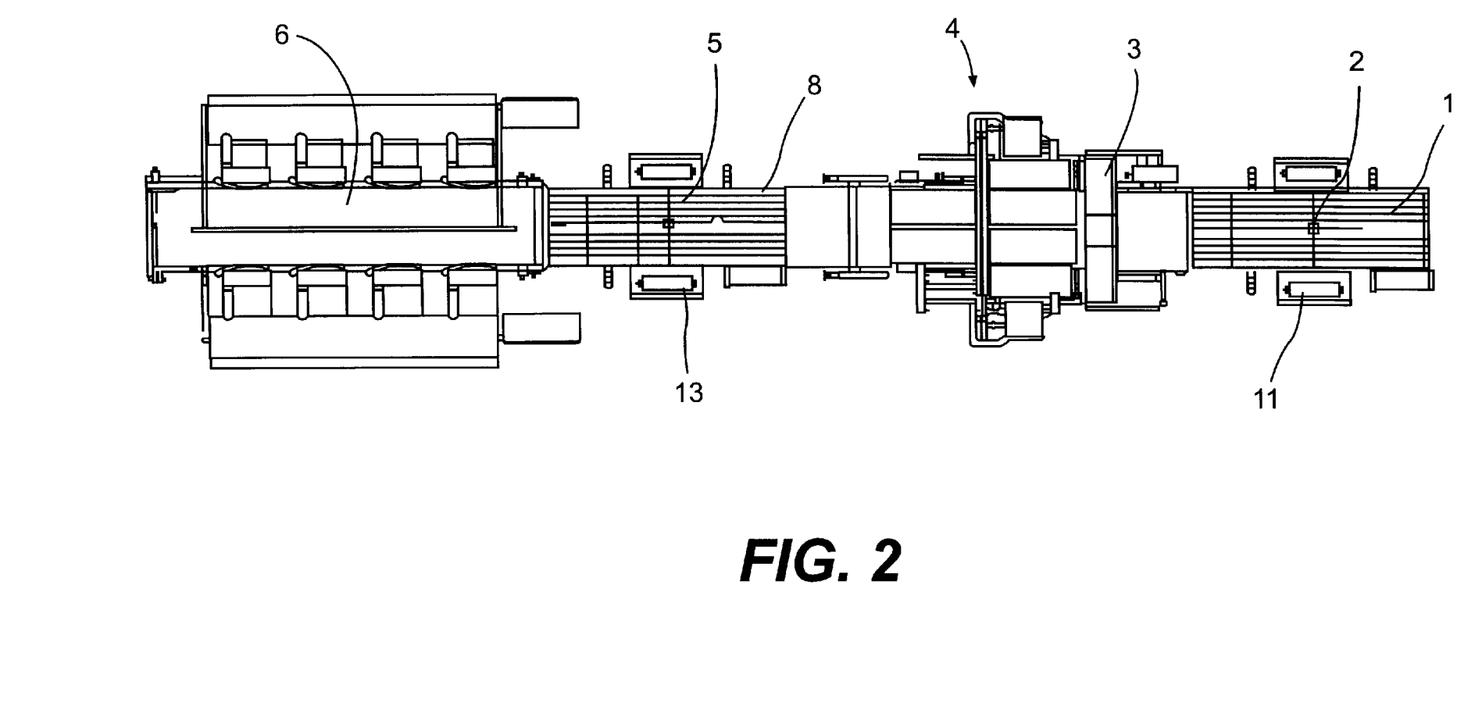
FIG. 2 is a top plan view of the portioning apparatus.

FIG. 2 shows the design of the equipment seen from above. The inweigher unit (2) is shown before the imaging equipment (3) with an inweigher control unit (11) located beside the conveyor belt (1). The inweigher control unit (11) can be considered to constitute part of the computer system (7) and can be used to independently control the operation of the inweigher (2) and/or the conveyor (1). Immediately after the imaging equipment is the cutting equipment (4), where the objects are cut into predetermined portions. From there, the objects are transported on a conveyor belt (8) to and across a second scale or outweighing unit (5), where individual cut portions are weighed in order to compare the sizes which the computer had previously calculated on the basis of the first weighing and imaging, and then to adjust the second calculation. As shown, an outweigher control unit 13 is disposed adjacent the third conveyer belt 8 and can be used to control the outweigher and/or conveyor belt (8). The outweigher control unit may be considered as part of the computer system (7). Finally, the portions are transported for further processing, e.g., to a size grader (6).

Figure 3:
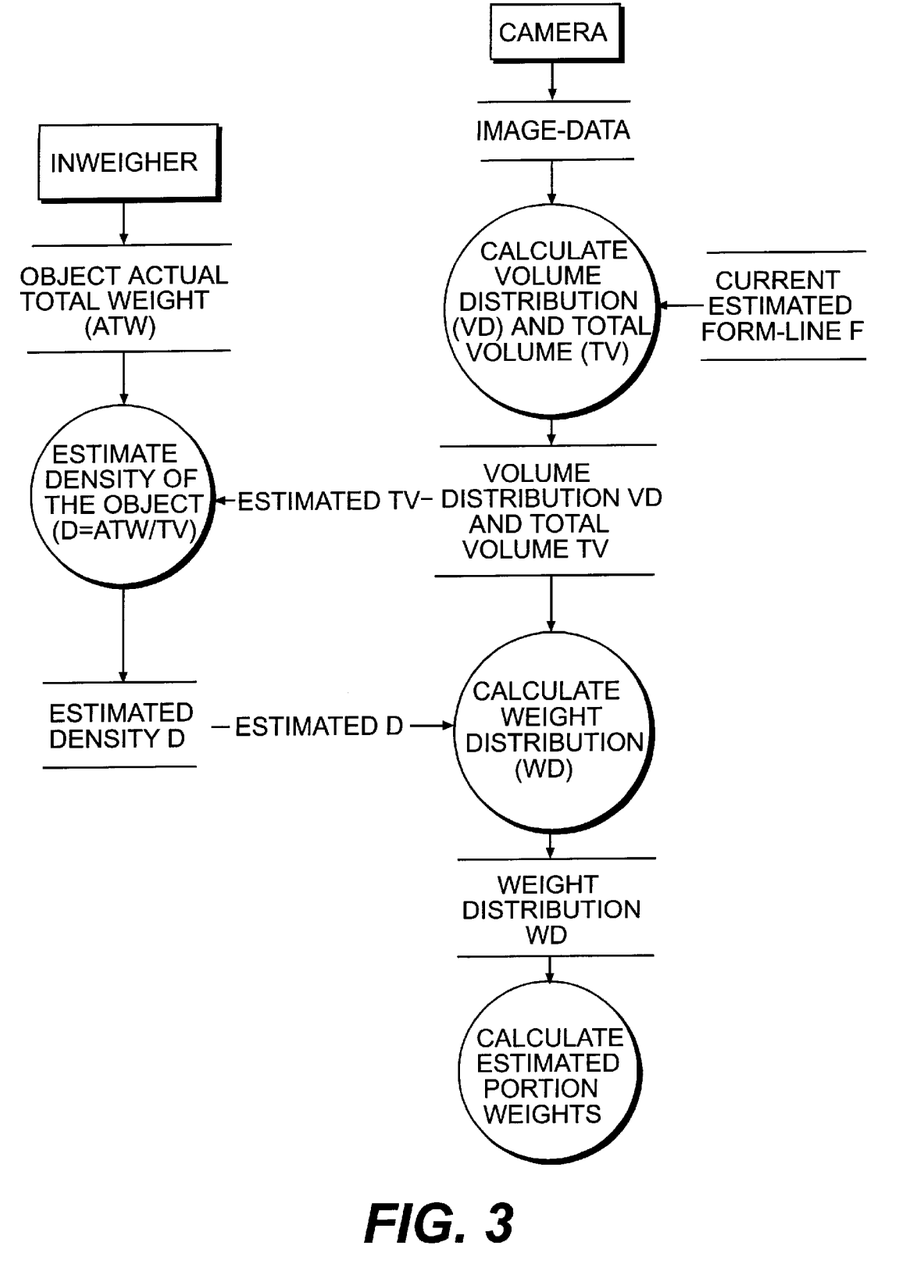
FIG. 3 is a flow diagram for the portioning apparatus when using the inweigher to control cutting.

FIG. 3 shows a flow diagram for the operation of the apparatus when relying upon the inweigher or first weighing unit (2) to control cutting.

1) As the object is transported along the in-feed conveyor of the apparatus it is weighed on a conveyor. In the embodiment shown, the conveyor comprises three conveyor belts, but the number or type of conveyor units comprising the conveyor is not critical. Here, the first weighing unit weighs the object to be cut on the first conveyor belt (1) (see FIGS. 1 and 2). The weighing unit (2) is a conventional flow scale disposed below the conveyor belt (1) and weighs the object to be cut as it is transported on the conveyor. The first weighing unit (inweigher) (2) weighs the total weight of the object and sends that actual total weight (ATW) to the computer system (7), where the weighing data is stored.

2) As the object is transported further and under the imaging equipment (3) (see FIGS. 1 and 2), the imaging camera (preferably of the linescan type) scans the object line by line and takes an image (I) of the object. Image data relating to the height (h), width (w) and length (l) is stored in the computer system (7). The actual total weight (ATW) is recalled.

3) The computer now calculated total volume (TV) and the estimated volume distribution (VD) by suing the image data and current estimated formline (f) for the product type to be processed at that time. In particular, the estimated total volume can be calculated as follows:

$$TV = \sum_{l=0}^{length} (h_l \cdot w_l \cdot f_l).$$

4) The computer stores the total volume (TV) and the volume distribution (VD).
5) The computer system (7) then calculates the estimated density of the object (D=ATW/TV).
6) The estimated density of the object (D) is then used to calculate the estimated weight distribution (WD) by suing the volume distribution (VD) and the total volume (TV) (WD=D×VD).
7) The computer system (7) stores the estimated weight distribution (WD) and the estimated total weight (TW), $$TW = \sum_{l=0}^{length} (WD_l).$$

8) The computer then uses specified cutting rules to calculate estimated portion weights (EPW) the object is to be cut into based upon the estimated weight distribution.
9) The computer then instructs the cutting device to cut the object into the calculated estimated portion weights (EPW) as the object is conveyed through the cutting unit (4) (see FIGS. 1 and 2).
10) The cut portions are then conveyed further to an outfeed conveyor or other equipment.

It should be appreciated from the above that when the cutting is controlled based upon the inweigher (2), the estimated formline remains fixed, and it is the density which is tuned.

Figure 4:
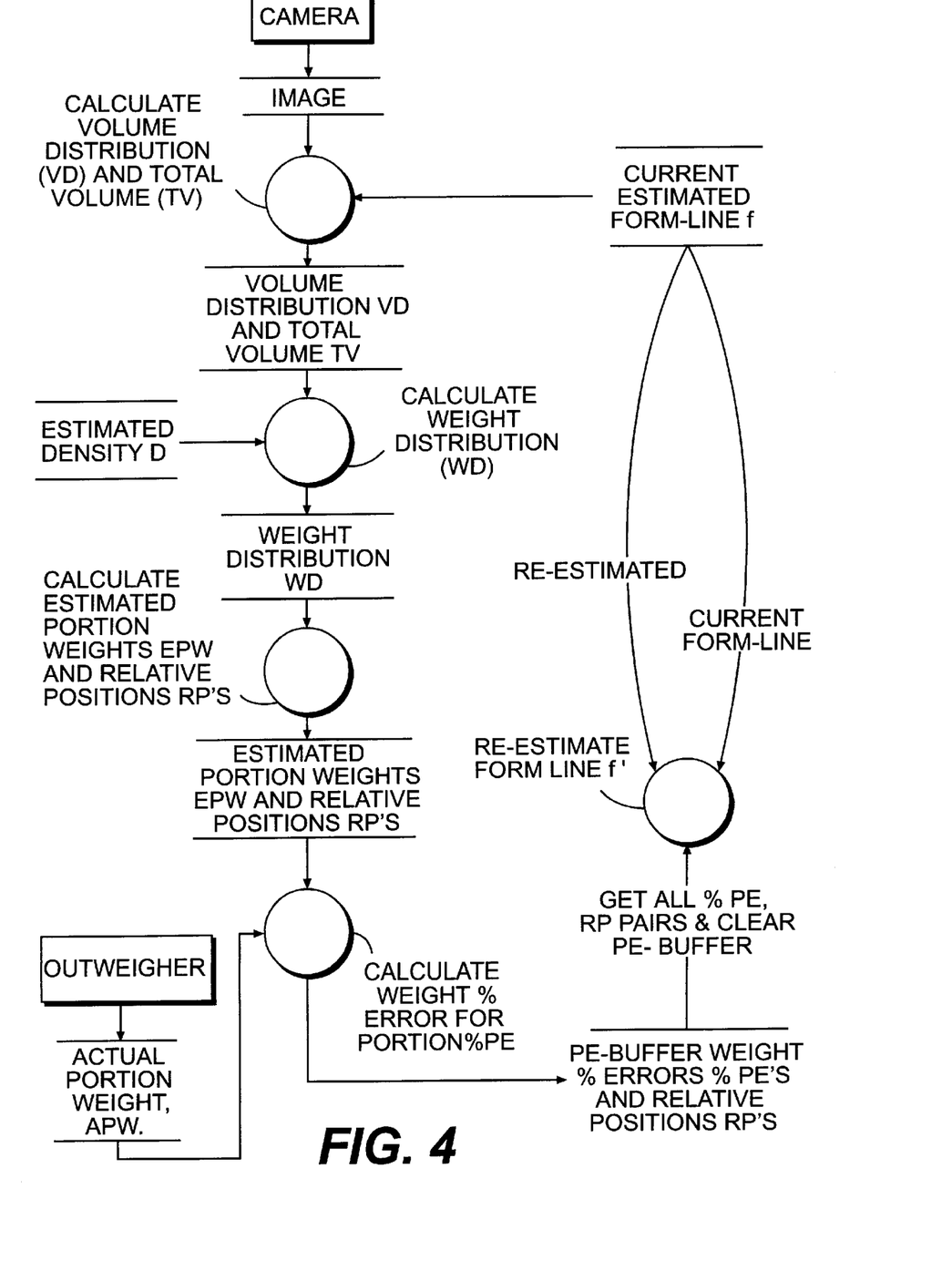
FIG. 4 is a flow diagram for the portioning apparatus when using the outweigher to control cutting.

FIG. 4 shows the flow diagram for the operation of the portioning apparatus when relying on the outweigher device (s) located after the cutting unit (4) for controlling cutting. The general idea in this mode of operation is to alter to tune at least one estimated physical characteristic for the object to be cut stored in the computer system (7) by use of feedback data. For example, the at least one physical characteristic in a preferred embodiment is an estimated formline, which is tuned or re-estimated based upon actual weighted portion weights after cutting compared to the estimated portion weights. The estimated formline is periodically updated based upon the percentage errors of such comparisons. In another embodiment, it may be the estimated density which is tuned.

1. As the object is transported along the apparatus underneath the imaging equipment (3) (see FIGS. 1 and 2), the object is scanned line by line and an image (I) is taken of the object. The image is used by the computer to establish image data (e.g., length, height, width, volume) for the object to be cut.
2. The computer then calculates the estimated total volume (TV) of the object and the estimated volume distribution (VD) by using the current estimated formline (f) for the product type to be processed at that time.
3. The computer stores the estimated total volume (TV) and estimated volume distribution (VD) in the computer memory.
4. The computer system (7) then calculates the estimated weight distribution (WD) and estimated total weight (TW) by using the estimated volume (TV), and the estimated volume distribution (VD) and estimated density (D).
5. The computer stores the weight distribution (WD) and total weight (TW) in memory.
6. The computer then uses specific cutting rules to determine estimated portion weights (EPW) the portion the object is to be cut into.
7. The computer stores the estimated portion weights (EPW) and their relative position (RP) in the whole object.
8. The cutting unit (4) then cuts the object into portions according to the estimated portion weight (EPW)
9. The cut portions are conveyed to the outweigher unit (5) (see FIGS. 1 and 2).
10. The weighing unit (5) weighs the portions and sends information about the actual portion weight (APW) to the computer.
11. The computer then calculates the error (PE %) or the deviation between the estimated portion weight (EPW) and the actual portion weight (APW)
12. The computer stores the PE % and the relative position (RP) of the portion that caused the error.
13. The computer calculates a formline correction based on plurality of PE % (and RP's) to re-estimate the formline.
14. The computer reads the current formline (that caused the PE %) and re-estimates it and stores it back.
15. The time between re-estimations is determined by the user.

Figure 5:
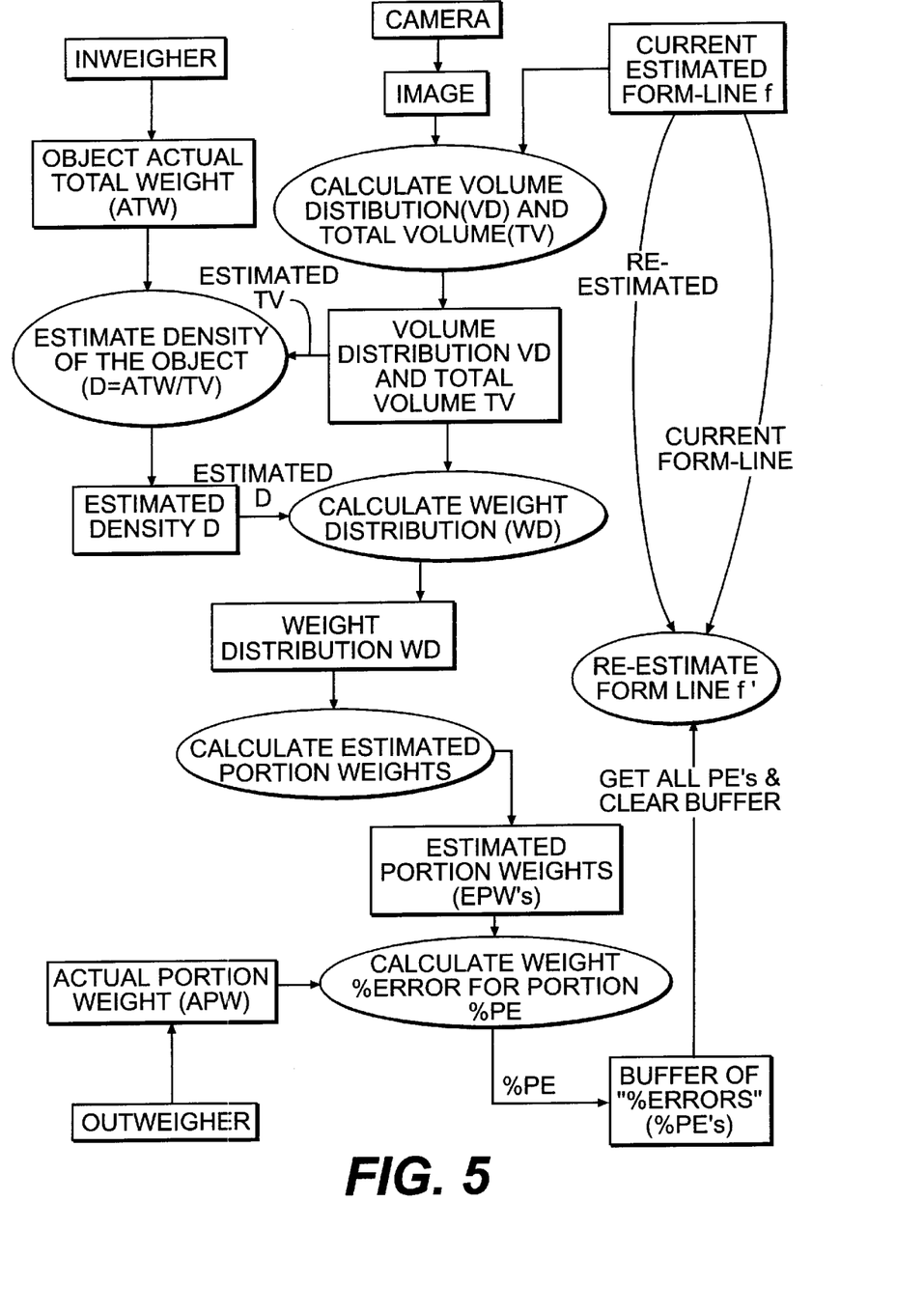
FIG. 5 is a flow diagram for the portioning apparatus when using both the inweigher and outweigher to control cutting.

FIG. 5 shows the flow diagram for the operation of the apparatus with both an inweigher (2) and an outweigher (5) units are used to control cutting.

1. As the object is transported along the in-feed conveyor of the apparatus it is weighed while travelling on the first conveyor (1) by the infeed weighing unit (2) (see FIGS. 1 and 2). The weighing device (2) weighs the total weight of the object and sends actual total weight (ATW) to the computer system (7), where the weighing data is stored.
2. As the object is transported further and under the imaging equipment (3) (see FIGS. 1 and 2), the camera scans the object line by line and creates an image (I) of the object. Image data relating to the height, weight, and total length is stored in the computer system (7). The actual total weight (ATW) is recalled.
3. The computer now calculates the estimated total value (TV) and the estimated volume distribution (VD) based on the image data established and the current estimated formline (f) for the product type to be processed at that time.
4. The computer stores the estimated total volume (TV) and estimated volume distribution (VD) in the computer memory.
5. The computer system (7) then calculates the estimated density of the object (D=ATW/TV).
6. The estimated density of the object (D) is then used to calculate the estimated weight distribution (WD) by using the estimated volume distribution (VD) and the estimated total volume (TV).
7. The computer system (7) stores the estimated weight distribution (WD) and the estimated total weight (TW).
8. The computer stores the estimated portion weights (EPW) and their relative position (RP) in the object.
9. The machine cuts the portions according to EPW and the portions are conveyed to the second weighing unit (5).
10. The second weighing unit (5) weighs the portions and sends the actual portion weight APW to the computer.
11. The computer calculates the error of the portion weight estimation PE %.

12. The computer stores the PE % and the relative position RP of the portion that caused the error.

13. The computer calculates a formline correction based on plurality of PE % (and RP's) to re-estimate the formline.

14. The computer reads the current formline (that caused the PE %) and re-estimates it and stores it back.

15. The time or number of objects cut between re-estimations is determined by the user.

Figure 6:
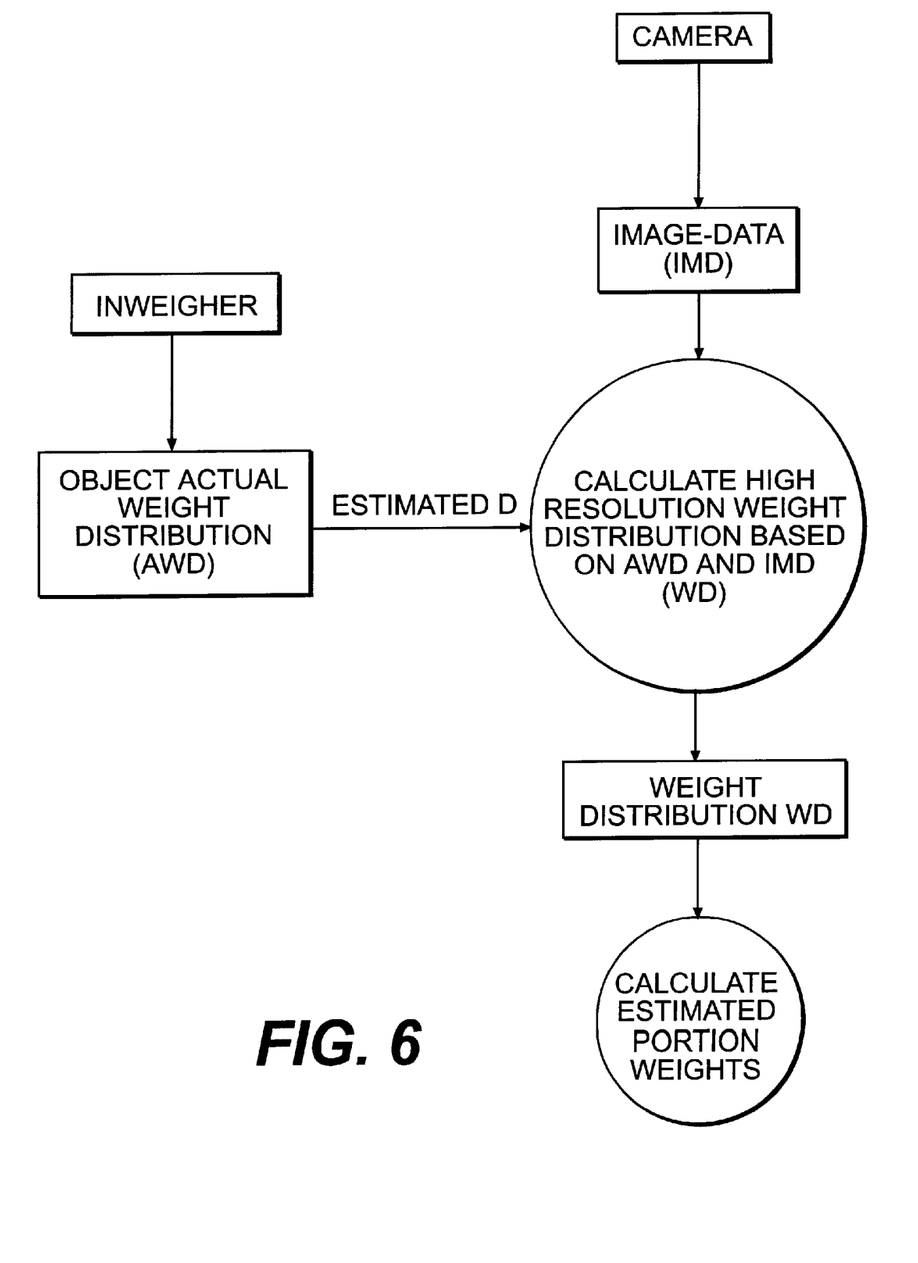
FIG. 6 is a flow diagram in an alternate arrangement wherein the inweigher is used to establish a weight distribution for the object to be cut.
Figure 7:
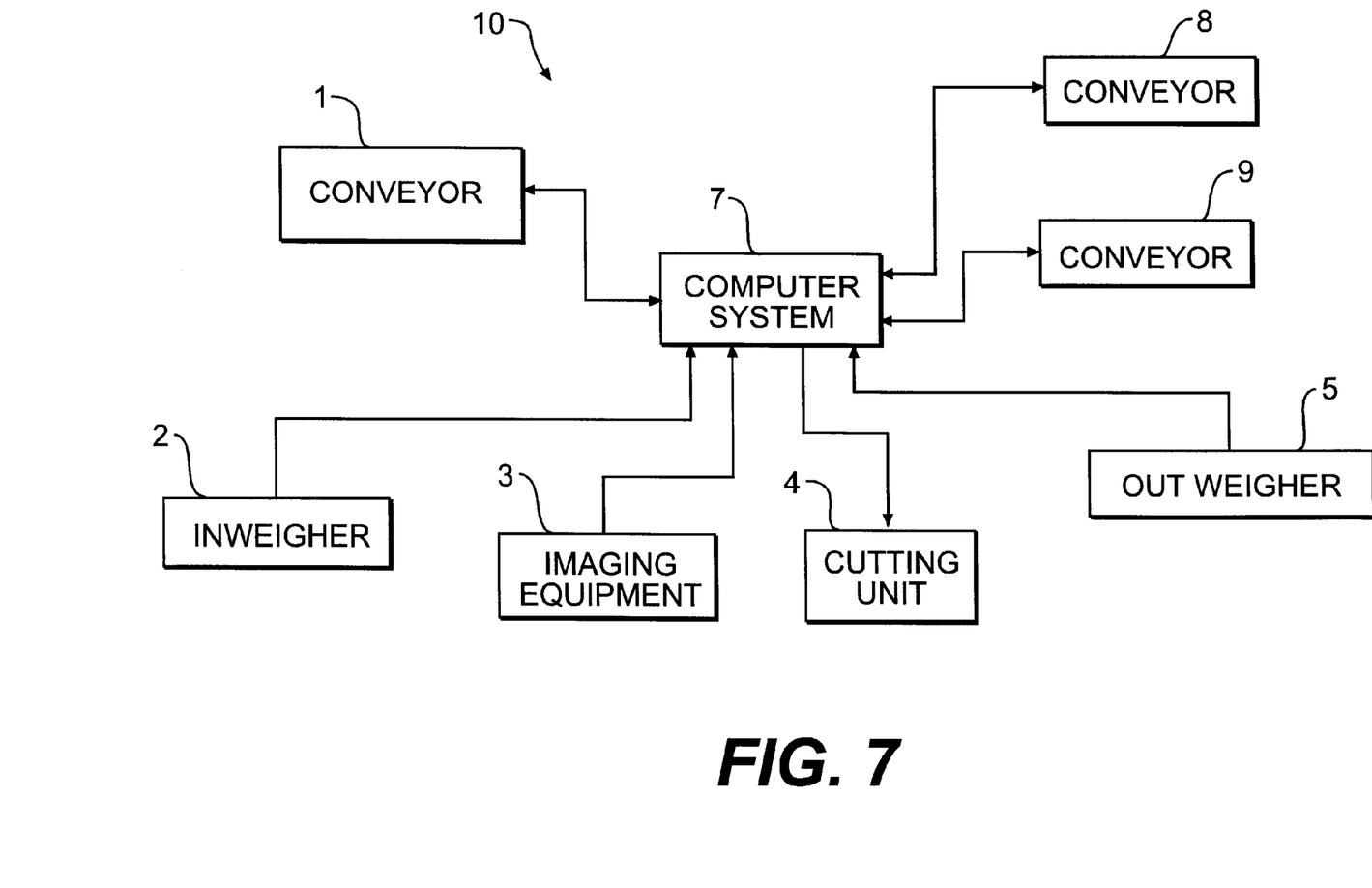
FIG. 7 is a schematic electrical block diagram showing the interrelation of components.

FIG. 6 is a flow diagram in an alternate arrangement wherein the inweigher (2) itself can be used to establish a weight distribution for the object to be cut. In this instance, the inweigher (2) not only measures the total weight, but is also used to achieve a weight profile or weight distribution of the object to be cut. This can be achieved for example, by measuring the decrease in weight on the conveyor belt (1) as the object to be cut leaves the first conveyor belt (1) and is received by the second conveyor belt (9). The decrease in weight can be plotted as a function of the length of the object (as determined by the distance travelled by the belt as the weight decreases) to achieve a weight distribution or profile of the object. If the object to be cut is received on the conveyor belt (1) from a previous conveyor belt, the increase in weight on the conveyor belt (1) can also be used to establish a weight distribution of the object.

The weight distribution determined by the inweigher (2) is then used to estimate the density of the object to be cut. The image data established by the imaging equipment (3) is used in conjunction with the estimated density of the object to calculate a higher resolution weight distribution than that determined by the inweigher (2). The higher resolution weight distribution is then used to calculate estimated portion weights into which the object will be cut.

It thus will be appreciated that the objects of the present invention have been fully and effectively accomplished. It will be realized, however, that the foregoing preferred specific embodiment has been shown and described for the purpose of this invention and are subject to change without departure from its basic principles. Therefore, this invention includes all modifications and equivalents encompassed within the spirit and scope of the following claims.

What is claimed is:

1. A method for automatically cutting objects into portions, comprising:
    conveying a present object to be cut;
    taking image data for the entire present object to be cut;
    processing at least one estimated physical characteristic established for previously cut objects and the image data for the entire present object to be cut to establish estimated portion weights into which the entire present object is to be cut prior to any cutting step;
    directing a cutting unit to cut the entire present object into portions having the estimated portion weights, the estimated portion weights not necessarily being uniform;
    weighing each of the cut portions to establish an actual weight for each of the cut portions;
    comparing the actual weight for each portion with the estimated portion weight thereof; and
    processing a plurality of such comparisons for re-estimating the at least one estimated physical characteristic for use in cutting future objects.

2. A method according to claim 1, wherein the at least one estimated physical characteristic comprises an estimated formline for the entire object to be cut.

3. A method according to claim 1, wherein the at least one estimated physical characteristic comprises an estimated density for the entire object to be cut.

4. A method according to claim 1, wherein the image data comprises height and width information of the entire object to be cut.

5. A method according to claim 1, further comprising the step of:
    determining a velocity of the conveyor to enable the cutting unit to cut at locations defining the estimated portion weights.

6. A method according to claim 4, wherein the image data further comprises length information of the entire object to be cut.

7. A method for automatically cutting objects into portions, comprising:
    conveying an object to be cut;
    weighing the entire object to be cut to establish an actual weight for the entire object to be cut;
    taking image data for the entire object to be cut;
    processing the actual weight and the image data to establish an estimated weight distribution for the entire object to be cut prior to any cutting step; and
    cutting the object based on the estimated weight distribution for the entire object to be cut, the portions not necessarily having a uniform weight.

8. A method according to claim 7, wherein the image data is used to estimate a total volume and a volume distribution of the entire object to be cut, and the estimated total volume and estimated volume distribution are processed in conjunction with the actual weight to establish the estimated weight distribution.

9. A method according to claim 8, wherein the estimated total volume and the actual weight is used to estimate the density of the entire object to be cut, and the estimated density and the estimated volume distribution are processed to establish the estimated weight distribution.

10. A method according to claim 8, wherein the image data is used to calculate the estimated total volume, and the estimated volume distribution comprises height, width, and length information of the entire object to be cut.

11. A method for automatically cutting objects into portions, comprising:
    conveying an object to be cut;
    weighing the entire object to be cut to establish an actual weight for the entire object to be cut;
    obtaining dimensional information on the entire object to be cut by imaging the entire object;
    processing the actual weight and the dimensional information to establish cutting control signals prior to any cutting step; and
    cutting the entire object based on the cutting control signals so that the entire object is cut into a plurality of pieces based on the actual weight and the dimensional information of the entire object, the actual weight of the pieces not necessarily being uniform.

12. A method for automatically cutting objects into portions, comprising:
    conveying a present object to be cut;
    obtaining dimensional information on the entire present object to be cut by imaging the entire object prior to any cutting step;
    cutting the entire present object into present pieces based on the dimensional information on the entire present object and on an actual weight of cut pieces from previously cut objects, the pieces not necessarily being uniform; and weighing the present pieces for use in cutting future objects.

13. A method for automatically cutting objects into portions, comprising:

conveying a present object to be cut;

taking image data in at least one image plane for the present object to be cut;

processing at least one estimated physical characteristic established for previously cut objects and the image data for the present object to be cut to establish estimated portion weights into which the present object is to be cut;

directing a cutting unit to cut the present object along at least one line intersecting with the at least one image plane into portions having the estimated portion weights;

weighing each of the cut portions to establish an actual weight for each of the cut portions;

comparing the actual weight for each portion with the estimated portion weight thereof; and processing a plurality of such comparisons for re-estimating the at least one estimated physical characteristic for use in cutting future objects.

14. A method for automatically cutting objects into portions, comprising:

conveying an object to be cut;

weighing the object to be cut to establish an actual weight for the object to be cut;

taking image data in at least one image plane for the object to be cut;

processing the actual weight and the image data to establish an estimated weight distribution for the object to be cut; and cutting the object based on the estimated weight distribution along at least one line intersecting with the at least one image plane.

15. A method for automatically cutting objects into portions, comprising:

conveying an object to be cut;

weighing the object to be cut to establish an actual weight for the object to be cut;

obtaining dimensional information on the object to be cut by imaging the in at least one imaging plane;

processing the actual weight and the dimensional information to establish cutting control signals; and cutting the object based on the cutting control signals so that the object is cut based on the actual weight and the dimensional information of the object along at least one line intersecting with the at least one image plane.

16. A method for automatically cutting objects into portions, comprising:

conveying a present object to be cut;

obtaining dimensional information on the present object to be cut by imaging the object in at least one imaging plane;

cutting the present object into present pieces along at least one line intersecting with the at least one imaging plane based on the dimensional information on the present object and on an actual weight of cut pieces from previously cut objects; and weighing the present pieces for use in cutting future objects.

17. An apparatus for automatic cutting of objects into pieces, comprising:

a conveyor that conveys the objects;

imaging equipment that takes image data for an entire present object to be cut into a plurality of pieces as the object is conveyed on the conveyor and that generates output signals representative of the image data;

a computer system that processes the output signals representative of the image data of the entire object to establish presently measured dimensional information for the entire present object to be cut, that calculates an estimated weight distribution for the entire present object to be cut based upon at least one estimated physical characteristic established by a plurality of previously cut objects and the presently measured dimensional information for the entire present object to be cut, and that processes the estimated weight distribution to pre-calculate an estimated weight for each of the pieces into which the entire present object is to be cut prior to any cutting operation;

a cutting unit, responsive to output from the computer system, that cuts each entire object into the pieces based on at least the estimated weight distribution for each entire object, the pieces not necessarily having a uniform weight; and a weighing unit disposed after the cutting unit that determines an actual weight for each cut piece and transmits data on the actual weight of each cut piece to the computer system; wherein the computer system compares the actual weight of each cut piece to the estimated weight for each piece, stores the comparison, periodically re-estimates the at least one estimated physical characteristic based upon a plurality of previously stored comparisons, and implements the at least one re-estimated physical characteristic for use with future image data to establish estimated weight distributions for future objects to be cut.

18. The apparatus according to claim 17, wherein the at least one estimated physical characteristic comprises an estimated formline for the entire object to be cut.

19. The apparatus according to claim 17, wherein the at least one physical characteristic comprises an estimated density of the entire object to be cut.

20. The apparatus according to claim 17, wherein the imaging equipment comprises a linescan camera which takes a series of consecutive images of the entire object to be cut from a plurality of angles.

21. The apparatus according to claim 17, wherein the weighing unit comprises at least one load cell operatively connected to the computer system.

22. The apparatus according to claim 17, wherein the dimensional information comprises height and width information of the entire object.

23. The apparatus according to claim 18, wherein the dimensional information comprises height and width information of the entire object.

24. The apparatus according to claim 22, wherein the dimensional information comprises length information of the entire object.

25. The apparatus according to claim 17, wherein the computer system determines a velocity of the conveyor to establish, in conjunction with the dimensional information, a relative position of the entire object to be cut on the conveyor.

26. An apparatus for automatic cutting of an object into pieces, comprising:

a conveyor that conveys the objects;

a weighing unit that obtains an actual weight of the entire object;

imaging equipment that takes image data for the entire object as it is conveyed on the conveyor;

a computer system that receives signals from the imaging equipment based upon image data for the entire object to estimate a total volume and a volume distribution of the entire object, and that processes the estimated volume distribution, the estimated total volume, and the actual weight to pre-calculate an estimated weight distribution for the entire object prior to any cutting operation; and a cutting unit, disposed after the weighing unit and operatively connected to the computer system, that cuts the entire object at locations based on at least the estimated weight distribution for the entire object, the cutting unit cutting the entire object into pieces that are not necessarily uniform in weight.

27. The apparatus according to claim 26, wherein the computer system processes the actual weight and the estimated total volume of the entire object to be cut to estimate the density for the entire object to be cut, the estimated density and the volume distribution being processed to calculate the estimated weight distribution for the entire object to be cut.

28. The apparatus according to claim 26, wherein the imaging equipment comprises a linescan camera which takes a series of consecutive images of the entire object to be cut from a plurality of angles.

29. The apparatus according to claim 26, wherein the weighing unit comprises at least one load cell operatively connected to the computer system.

30. The apparatus according to claim 26, wherein the image data comprises height and width information of the entire object to be cut.

31. The apparatus according to claim 27, wherein the image data comprises height and width information of the entire object to be cut.

32. The apparatus according to claim 31, wherein the image data further comprises length information of the entire object to be cut.

33. The apparatus according to claim 26, wherein the computer system determines a velocity of the conveyor to establish, in conjunction with the image data, a relative position of the entire object to be cut on the conveyor.

34. An apparatus for automatic cutting of objects into pieces, comprising:

a conveyor that conveys the objects;

imaging equipment that takes image data for an entire present object to be cut into a plurality of pieces as the entire object is conveyed on the conveyor and that generates output signals representative of the image data;

a cutting unit that cuts the objects on the conveyor into pieces;

a weighing unit before the cutting unit that determines a total actual weight for the entire present object to be cut;

a weighing unit after the cutting unit that determines an actual weight for each cut piece, and that transmits output data representing the actual weight of each cut piece; and a computer system that processes the output signal representative of the image data of the entire object and a current estimated formline to establish an estimated volume distribution and estimated total volume for the entire present object to be cut, that calculates an estimated density of the entire present object to be cut based upon the estimated total volume of the entire object to be cut and the actual total weight of the entire present object to be cut, that calculates an estimated weight distribution for the entire present object to be cut based upon the estimated density of the entire present object to be cut and the presently measured estimated volume distribution for the entire present object to be cut, and that processes the estimated weight distribution to pre-calculate an estimate weight for each of the pieces into which the entire present object is to be cut prior to any cutting operation;

wherein the cutting unit, responsive to output from the computer system, cuts each object into the pieces based on at least the estimated weight distribution for that entire object, the pieces not necessarily having a uniform weight;

wherein the computer system compares the actual weight of each cut piece to the estimated weight for that piece to establish a percentage error therebetween stores the percentage error, and periodically utilizes a plurality of previously calculated percentage errors and the current estimated formline to establish a re-estimated formline for use with future image data to establish total volumes and estimated volume distributions for future objects to be cut.

35. An apparatus for automatic cutting of objects into pieces, comprising:

a conveyor that conveys the objects;

imaging equipment that takes image data in at least one image plane for a present object to be cut as the object is conveyed on the conveyor and that generates output signals representative of the image data;

a computer system that processes the output signals representative of the image data to establish presently measured dimensional information for the present object to be cut, that calculates an estimated weight distribution for the present object to be cut based upon at least one estimated physical characteristic established by a plurality of previously cut objects and the presently measured dimensional information for the present object to be cut, and that processes the estimated weight distribution to calculate an estimated weight for each of the pieces into which the present object is to be cut;

a cutting unit, responsive to output from the computer system, that cuts each object along at least one line intersecting with the at least one image plane into the pieces based on at least the estimated weight distribution for each object; and a weighing unit disposed after the cutting unit that determines an actual weight for each cut piece and transmits data on the actual weight of each cut piece to the computer system;

wherein the computer system compares the actual weight of each cut piece to the estimated weight for each piece, stores the comparison, periodically re-estimates the at least one estimated physical characteristic based upon a plurality of previously stored comparisons, and implements the at least one re-estimated physical characteristic for use with future image data to establish estimated weight distributions for future objects to be cut.

36. An apparatus for automatic cutting of an object into pieces, comprising:

a conveyor that conveys the objects;

a weighing unit that obtains an actual weight of the object;

imaging equipment that takes image data in at least one image plane for the object as it is conveyed on the conveyor;

a computer system that receives signals from the imaging equipment based upon the image data to estimate a total volume and a volume distribution of the object, and that utilizes the estimated volume distribution, the estimated total volume, and the actual weight to calculate an estimated weight distribution for the object; and a cutting unit, disposed after the weighing unit and operatively connected to the computer system, that cuts the object along at least one line intersecting with the at least one image plane based on at least the estimated weight distribution for the object.

37. An apparatus for automatic cutting of objects into pieces, comprising:

a conveyor that conveys the objects;

imaging equipment that takes image data in at least one image plane for a present object to be cut as the object is conveyed on the conveyor and that generates output signals representative of the image data;

a cutting unit that cuts the objects on the conveyor into pieces;

a weighing unit before the cutting unit that determines a total actual weight for the present object to be cut;

a weighing unit after the cutting unit that determines an actual weight for each cut piece and that transmits output data representing the actual weight of each cut piece; and a computer system that processes the output signal representative of the image data and a current estimated formline to establish an estimated volume distribution and estimated total volume for the present object to be cut, that calculates an estimated density of the present object to be cut based upon the estimated total volume of the object to be cut and the actual total weight of the present object to be cut, that calculates an estimated weight distribution for the present object to be cut based upon the estimated density of the present object to be cut and the presently measured estimated volume distribution for the present object to be cut, and that processes the estimated weight distribution to calculate an estimate weight for each of the pieces into which the present object is to be cut;

wherein the cutting unit, responsive to output from the computer system, cuts each object along at least one line intersecting with the at least one image plane into the pieces based on at least the estimated weight distribution for that object;

wherein the computer system compares the actual weight of each cut piece to the estimated weight for that piece to establish a percentage error therebetween stores the percentage error, and periodically utilizes a plurality of previously calculated percentage errors and the current estimated formline to establish a re-estimated formline for use with future image data to establish estimated total volumes and estimated volume distributions for future objects to be cut.

* * * * *

US006164174C1

(12) EX PARTE REEXAMINATION CERTIFICATE (10776th)
United States Patent
Sigurdsson et al.

(10) Number: US 6,164,174 C1
(45) Certificate Issued: Dec. 9, 2015

(54) COMPUTER CONTROLLED PORTIONING MACHINE

(75) Inventors: Arni Sigurdsson, Reykjavik (IS); Arni G. Sigurdsson, Seltjarnarnes (IS); Helgi Hjalmarsson, Reykjavik (IS); Hordur Arnarson, Reykjavik (IS)

(73) Assignee: MAREL HF

Reexamination Request:
No. 90/013,485, Apr. 3, 2015

Reexamination Certificate for:
Patent No.: 6,164,174
Issued: Dec. 26, 2000
Appl. No.: 09/023,072
Filed: Feb. 13, 1998

(30) Foreign Application Priority Data

Feb. 13, 1997 (IS) ................................. 4428

(51) Int. Cl.
*B26D 7/30* (2006.01)
*B26D 7/00* (2006.01)
*A22C 25/18* (2006.01)

(52) U.S. Cl.
CPC . *A22C 25/18* (2013.01); *B26D 7/30* (2013.01); *Y10S 83/932* (2013.01); *Y10T 83/04* (2015.04); *Y10T 83/148* (2015.04); *Y10T 83/182* (2015.04); *Y10T 83/533* (2015.04); *Y10T 83/536* (2015.04); *Y10T 83/541* (2015.04)

(58) Field of Classification Search
None
See application file for complete search history.

(56) References Cited

To view the complete listing of prior art documents cited during the proceeding for Reexamination Control Number 90/013,485, please refer to the USPTO's public Patent Application Information Retrieval (PAIR) system under the Display References tab.

*Primary Examiner* — William Doerrler (57) ABSTRACT

The invention involves a method and apparatus for automatic portioning of objects. More specifically, the invention utilizes both weighing and imaging data in order to calculate an estimated weight distribution of objects being processed. Once or more weighing units, which weigh one or more parts of the objects, are installed before and/or after a cutting unit to obtain the weighing data. A computer system controls cutting based on the imaging data and the weighing data.

US 6,164,174 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 13-16 and 35-37 are determined to be patentable as amended.

Claims 1-12 and 17-34 were not reexamined.

13. A method for automatically cutting objects into portions, comprising:
    conveying a present object to be cut;
    taking image data in at least one image plane for the present object to be cut;
    processing at least one estimated physical characteristic established for previously cut objects and the image data for the present object to be cut to establish estimated portion weights into which the present object is to be cut;
    directing a cutting unit to cut the present object along at least one line intersecting with the at least one image plane into portions having the estimated portion weights, *the portions not necessarily having a uniform weight*;
    weighing each of the cut portions to establish an actual weight for each of the cut portions;
    comparing the actual weight for each portion with the estimated portion weight thereof; and
    processing a plurality of such comparisons for re-estimating the at least one estimated physical characteristic for use in cutting future objects.

14. A method for automatically cutting objects into portions, comprising:
    conveying an object to be cut;
    weighing the object to be cut to establish an actual weight for the object to be cut;
    taking image data in at least one image plane for the object to be cut;
    processing the actual weight and the image data to establish an estimated weight distribution for the object to be cut; and
    cutting the object *into portions* based on the estimated weight distribution along at least one line intersecting with the at least one image plane, *the portions not necessarily having a uniform weight*.

15. A method for automatically cutting objects into portions, comprising:
    conveying an object to be cut;
    weighing the object to be cut to establish an actual weight for the object to be cut;
    obtaining dimensional information on the object to be cut by imaging the in at least one imaging plane;
    processing the actual weight and the dimensional information to establish cutting control signals; and
    cutting the object *into portions* based on the cutting control signals so that the object is cut based on the actual weight and the dimensional information of the object along at least one line intersecting with the at least one image plane, *the portions not necessarily having a uniform weight*.

16. A method for automatically cutting objects into portions, comprising:
    conveying a present object to be cut;
    obtaining dimensional information on the present object to be cut by imaging the object in at least one imaging plane;
    cutting the present object into present pieces along at least one line intersecting with the at least one imaging plane based on the dimensional information on the present object and on an actual weight of cut pieces from previously cut objects, *the weight of the cut pieces not necessarily being uniform*; and
    weighing the present pieces for use in cutting future objects.

35. An apparatus for automatic cutting of objects into pieces, comprising:
    a conveyor that conveys the objects;
    imaging equipment that takes image data in at least one image plane for a present object to be cut as the object is conveyed on the conveyor and that generates output signals representative of the image data;
    a computer system that processes the output signals representative of the image data to establish presently measured dimensional information for the present object to be cut, that calculates an estimated weight distribution for the present object to be cut based upon at least one estimated physical characteristic established by a plurality of previously cut objects and the presently measured dimensional information for the present object to be cut, and that processes the estimated weight distribution to calculate an estimated weight for each of the pieces into which the present object is to be cut;
    a cutting unit, responsive to output from the computer system, that cuts each object along at least one line intersecting with the at least one image plane into the pieces based on at least the estimated weight distribution for each object, *the pieces not necessarily having a uniform weight*; and
    a weighing unit disposed after the cutting unit that determines an actual weight for each cut piece and transmits data on the actual weight of each cut piece to the computer system;
    wherein the computer system compares the actual weight of each cut piece to the estimated weight for each piece, stores the comparison, periodically re-estimates the at least one estimated physical characteristic based upon a plurality of previously stored comparisons, and implements the at least one re-estimated physical characteristic for use with future image data to establish estimated weight distributions for future objects to be cut.

36. An apparatus for automatic cutting of an object into pieces, comprising:
    a conveyor that conveys the objects;
    a weighing unit that obtains an actual weight of the object;
    imaging equipment that takes image data in at least one image plane for the object as it is conveyed on the conveyor;
    a computer system that receives signals from the imaging equipment based upon the image data to estimate a total volume and a volume distribution of the object, and that utilizes the estimated volume distribution, the estimated total volume, and the actual weight to calculate an estimated weight distribution for the object; and a cutting unit, disposed after the weighing unit and operatively connected to the computer system, that cuts the object along at least one line intersecting with the at least one image plane based on at least the estimated weight distribution for the object, *the cutting unit cutting the object into pieces that are not necessarily uniform in weight.*

37. An apparatus for automatic cutting of objects into pieces, comprising:

a conveyor that conveys the objects;

imaging equipment that takes image data in at least one image plane for a present object to be cut as the object is conveyed on the conveyor and that generates output signals representative of the image data;

a cutting unit that cuts the objects on the conveyor into pieces;

a weighing unit before the cutting unit that determines a total actual weight for the present object to be cut;

a weighing unit after the cutting unit that determines an actual weight for each cut piece and that transmits output data representing the actual weight of each cut piece; and a computer system that processes the output signal representative of the image data and a current estimated formline to establish an estimated volume distribution and estimated total volume for the present object to be cut, that calculates an estimated density of the present object to be cut based upon the estimated total volume of the object to be cut and the actual total weight of the present object to be cut, that calculates an estimated weight distribution for the present object to be cut based upon the estimated density of the present object to be cut and the presently measured estimated volume distribution for the present object to be cut, and that processes the estimated weight distribution to calculate an estimate weight for each of the pieces into which the present object is to be cut;

wherein the cutting unit, responsive to output from the computer system, cuts each object along at least one line intersecting with the at least one image plane into the pieces based on at least the estimated weight distribution for that object, *the pieces not necessarily having a uniform weight*;

wherein the computer system compares the actual weight of each cut piece to the estimated weight for that piece to establish a percentage error therebetween stores the percentage error, and periodically utilizes a plurality of previously calculated percentage errors and the current estimated formline to establish a re-estimated formline for use with future image data to establish estimated total volumes and estimated volume distributions for future objects to be cut.

* * * * *